US012612249B2

(12) United States Patent
Boivin

(10) Patent No.: US 12,612,249 B2
(45) Date of Patent: Apr. 28, 2026

(54) MECHANICAL ARM

(71) Applicant: The Heil Co., Chattanooga, TN (US)

(72) Inventor: Claude Boivin, Lévis (CA)

(73) Assignee: The Heil Co., Chattanooga, TN (US)

( * ) Notice: Subject to any disclaimer, the term of this patent is extended or adjusted under 35 U.S.C. 154(b) by 568 days.

(21) Appl. No.: 17/939,609

(22) Filed: Sep. 7, 2022

(65) Prior Publication Data

US 2023/0090272 A1 Mar. 23, 2023

Related U.S. Application Data

(60) Provisional application No. 63/245,399, filed on Sep. 17, 2021.

(51) Int. Cl.
| | |
|---|---|
| *B65F 3/08* | (2006.01) |
| *B25J 9/10* | (2006.01) |
| *B25J 18/02* | (2006.01) |
| *B65F 3/02* | (2006.01) |
| *B66F 9/08* | (2006.01) |

(52) U.S. Cl.
CPC ................. *B65F 3/08* (2013.01); *B25J 9/104* (2013.01); *B25J 18/025* (2013.01); *B66F 9/08* (2013.01); *B65F 2003/0266* (2013.01)

(58) Field of Classification Search
CPC .. B25J 9/104; B25J 18/025; B25J 9/04; B65F 3/08; B65F 2003/025; B65F 2003/0266; B65G 1/0435; B66F 9/08
USPC .................................. 187/226, 236; 414/409
See application file for complete search history.

(56) References Cited

U.S. PATENT DOCUMENTS

| | | | | |
|---|---|---|---|---|
| 1,625,290 | A | * | 4/1927 | Stockfleth et al. ....... B66F 9/08 187/233 |
| 1,991,576 | A | * | 2/1935 | Remde .................... B66F 9/082 187/226 |
| 2,169,440 | A | * | 8/1939 | Weiss ..................... B66F 9/082 74/15.2 |
| 4,313,707 | A | * | 2/1982 | Bingman ................. B65F 3/08 414/544 |
| 4,401,407 | A | * | 8/1983 | Breckenridge ......... B65F 3/043 414/733 |
| 7,553,121 | B2 | | 6/2009 | Curotto et al. |

(Continued)

FOREIGN PATENT DOCUMENTS

| | | |
|---|---|---|
| CA | 3072106 | 2/2019 |
| CA | 3080044 | 11/2020 |

(Continued)

*Primary Examiner* — James Keenan
(74) *Attorney, Agent, or Firm* — Fish & Richardson P.C.

(57) ABSTRACT

A mechanical arm designed to provide automated garbage collection with smooth, constant movement (i.e. movement that has minimal jerk/shock) thereby resulting in limited shock stress on the components and leading to high durability. The mechanical arm including a horizontal displacement system having a plurality of sections rollingly engaged to one another and a motor mounted to an immobile section for drivingly extending section in a generally horizontal orientation, a vertical displacement system having a plurality of masts rollingly engaged to one another and a motor mounted to a first mast for drivingly extending a second mast in a generally vertical orientation, and/or a grabber system having a plurality of fingers mounted to a frame and operated by a single motor.

20 Claims, 15 Drawing Sheets

(56) References Cited

U.S. PATENT DOCUMENTS

| | | | | |
|---|---|---|---|---|
| 8,790,061 | B2 * | 7/2014 | Yamashita | B65G 1/0435 414/280 |
| 9,267,307 | B2 * | 2/2016 | St-Yves | B25J 15/024 |
| 9,834,377 | B1 * | 12/2017 | Hayes | B65F 3/041 |
| 10,730,694 | B2 * | 8/2020 | Goedken | B65F 3/08 |
| 11,332,308 | B2 * | 5/2022 | Boivin | B65F 3/08 |
| 11,597,075 | B2 * | 3/2023 | Gonzales | B25J 18/025 |
| 2016/0207708 | A1 * | 7/2016 | Schell | B65F 3/043 |
| 2020/0346547 | A1 | 11/2020 | Rocholl et al. | |
| 2020/0346556 | A1 | 11/2020 | Rocholl et al. | |
| 2020/0346557 | A1 | 11/2020 | Rocholl et al. | |
| 2020/0346657 | A1 | 11/2020 | Clifton et al. | |
| 2020/0346854 | A1 | 11/2020 | Rocholl et al. | |
| 2020/0346855 | A1 | 11/2020 | Rocholl et al. | |
| 2020/0346856 | A1 | 11/2020 | Rocholl et al. | |
| 2020/0346857 | A1 | 11/2020 | Rocholl et al. | |
| 2020/0346858 | A1 | 11/2020 | Buege et al. | |
| 2020/0346859 | A1 | 11/2020 | Buege et al. | |
| 2020/0346860 | A1 | 11/2020 | Buege et al. | |
| 2020/0346861 | A1 | 11/2020 | Rocholl et al. | |
| 2020/0346862 | A1 | 11/2020 | Rocholl et al. | |
| 2020/0347659 | A1 | 11/2020 | Rocholl et al. | |
| 2020/0347661 | A1 | 11/2020 | Rocholl et al. | |
| 2020/0347857 | A1 | 11/2020 | Clifton et al. | |
| 2020/0348681 | A1 | 11/2020 | Clifton et al. | |
| 2020/0348764 | A1 | 11/2020 | Clifton et al. | |
| 2021/0122568 | A1 | 4/2021 | Boivin et al. | |
| 2021/0170587 | A1 * | 6/2021 | Tanishima | B25J 9/104 |
| 2022/0106114 | A1 | 4/2022 | Buege et al. | |
| 2022/0106115 | A1 | 4/2022 | Buege et al. | |

FOREIGN PATENT DOCUMENTS

| | | | | |
|---|---|---|---|---|
| CA | 3080360 | | 11/2020 | |
| CA | 3080364 | | 11/2020 | |
| CN | 103991817 A | * | 8/2014 | B66F 9/08 |
| CN | 209522153 U | * | 10/2019 | B25J 15/0014 |
| DE | 102006032206 A1 | * | 1/2008 | B65F 3/08 |
| DE | 102008013940 A1 | * | 9/2009 | B65F 3/041 |
| EP | 0749915 B1 | * | 2/2002 | B65G 1/0435 |
| KR | 20120007758 A | * | 1/2021 | B25J 18/025 |
| WO | WO-2010002044 A1 | * | 1/2010 | B25J 18/025 |
| WO | WO 2019/033201 | | 2/2019 | |
| WO | WO 2019/153066 | | 8/2019 | |
| WO | WO-2023283677 A1 | * | 1/2023 | B25J 18/025 |

* cited by examiner

MECHANICAL ARM

CROSS-REFERENCE TO RELATED APPLICATIONS

This application claims the benefit under 35 U.S.C. § 119(e) of U.S. Patent Application No. 63/245,399, entitled "Mechanical Arm," filed Sep. 17, 2021, which is incorporated herein by reference in its entirety.

TECHNICAL FIELD

This disclosure generally relate to the field of garbage collection trucks and, more particularly, to the field of mechanical arms used to hold and lift bins to be emptied in such trucks.

BACKGROUND

Known mechanical arms for performing automated collection of garbage bins and dumping of the content of the garbage bins in a container of a corresponding garbage collection truck have been satisfactory to a certain degree, but there remains room for improvement. For instance, some mechanical arms performing automated collection of garbage tend to suffer from efficiency or durability issues, i.e. they tend to be subject to high failure rates as a result of designs which were not strong enough to withstand the high number of cycles and the heavy loads involved and required more maintenance than what was desired. In some cases, mechanical arms which are designed to achieve high performances in terms of cycle time, versatility and/or durability, may suffer from high manufacturing costs.

In view of the above, there is a need for an improved mechanical arm for a garbage collection truck performing automated garbage collection from a garbage bin which, by virtue of its design and components, would be able to overcome or at least minimize some of the above-discussed prior art concerns.

SUMMARY

It was found that providing at least one of a horizontal displacement system having a plurality of sections rollingly engaged to one another and a motor mounted to an immobile section for drivingly extending section in a generally horizontal orientation, a vertical displacement system having a plurality of masts rollingly engaged to one another and a motor mounted to a first mast for drivingly extending a second mast in a generally vertical orientation, and a grabber system having a plurality of fingers mounted to a frame and operated by a single motor, permitted to at least provide the advantages of smooth, constant movements (i.e. movements that have minimal jerk/shock) thereby resulting in limited shock stress on the components and leading to high durability.

In accordance with one aspect, there is provided a horizontal displacement system for a mechanical arm of a garbage truck, comprising: a proximal section securable to a frame of the garbage truck; a distal section rollingly engaged to the proximal section and movable relative to the proximal section in a direction being substantially parallel to a ground; and a motor drivingly engaged to the distal section and operable to move the distal section relative to the proximal section between a retracted configuration in which the proximal and distal section overlap one another and an expanded configuration in which at least a portion of the distal section is offset from the proximal section, wherein the motor is mounted to the proximal section and remains immobile relative to the frame of the garbage truck between the retracted configuration and the expanded configuration.

In accordance with another aspect, there is provided a mechanical arm of a garbage truck, comprising: a first mast; a second mast rollingly engaged to the first mast and movable relative to the first mast in a direction being substantially perpendicular to the ground; a grabber system mounted to the second mast, the gabber system having at least two actuated fingers for holding a bin to be discharged in the garbage truck; and a motor drivingly engaged to the second mast and operable to move the second mast and the grabber system relative to the first mast between a low position and a high position, a height of the grabber system greater in the high position than in the low position, wherein the motor is mounted to the first mast and remains substantially at a constant height between the low and high positions of the second mast.

In accordance with yet another aspect, there is provided a grabber system for a mechanical arm of a garbage collection truck, comprising: a frame; a right finger and a left finger, the right and left fingers pivotally mounted on the frame and movable between open and close positions to grab a bin; a single motor drivingly engaged to the at least two fingers; and a drive assembly drivingly engaged by the single motor and drivingly engaging both of the right finger and the left finger.

Many further features and combinations thereof concerning the present improvements will appear to those skilled in the art following a reading of the instant disclosure.

3

Figure 2:
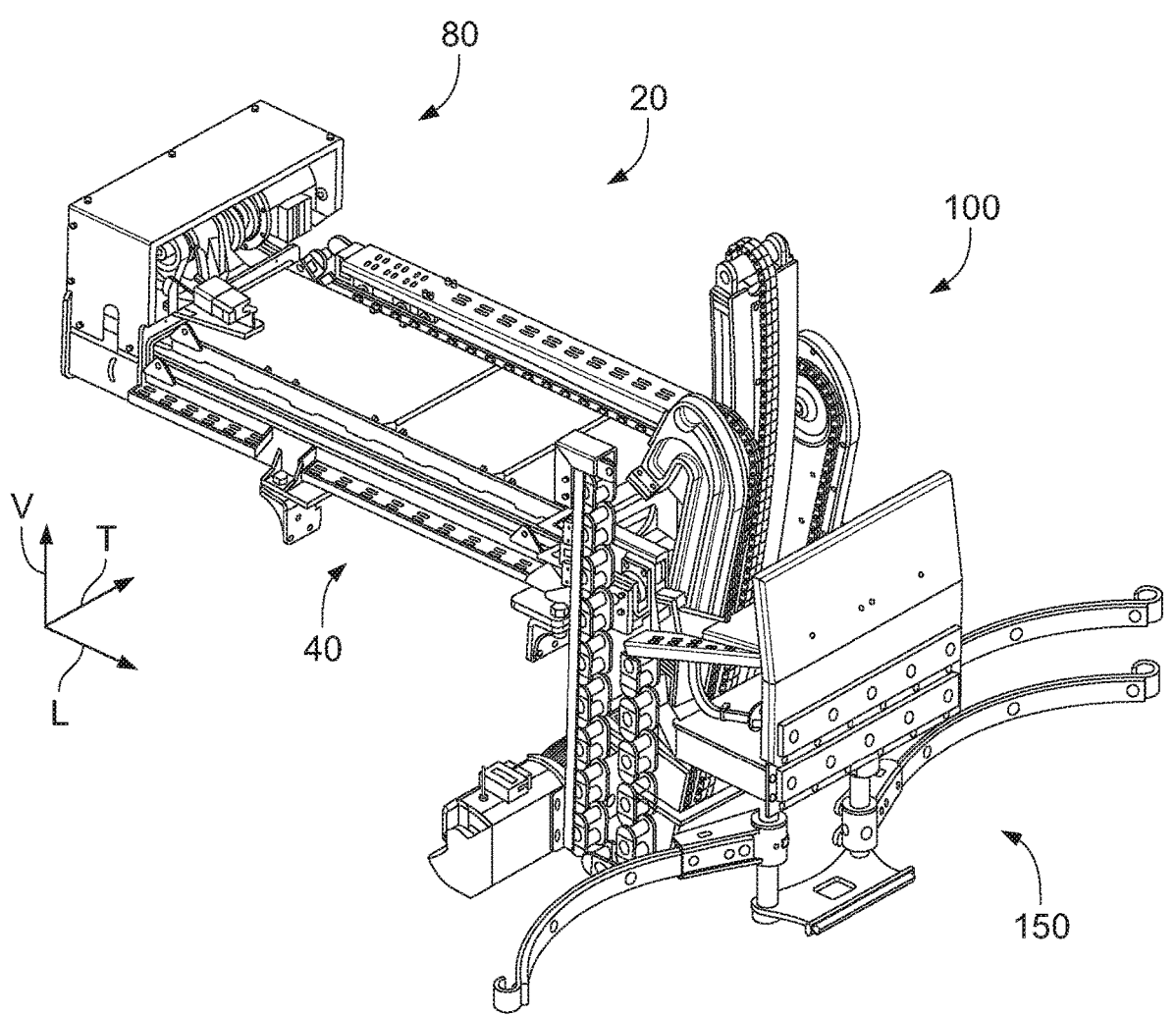
FIG. 2 is a three dimensional view of an exemplary mechanical arm to be used in conjunction with the garbage collection truck of FIG. 1.
Figure 12:
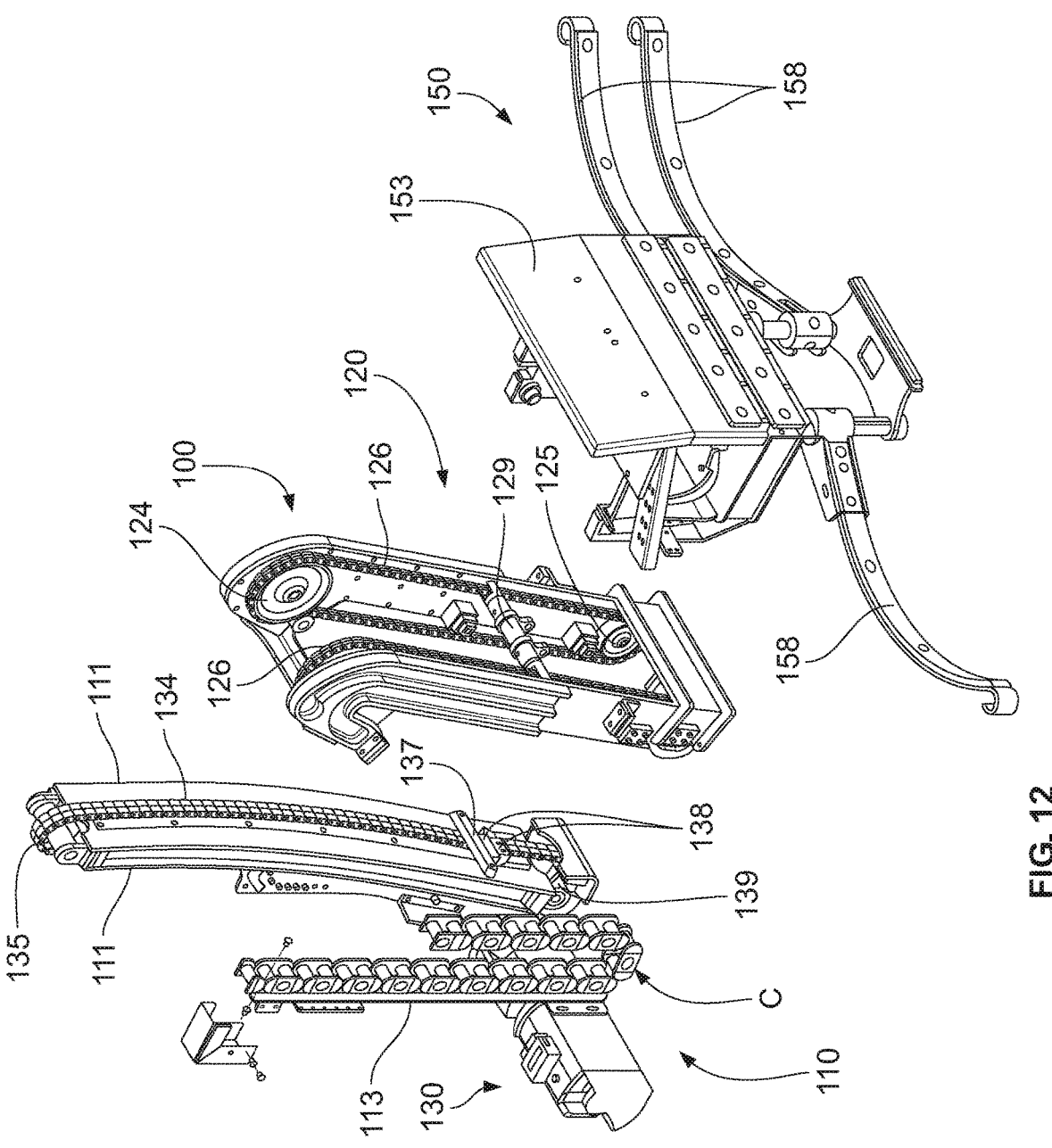
FIG. 12 is a three dimensional exploded view of an exemplary vertical displacement system and of a grabber system of the exemplary mechanical arm of FIG. 3.
Figure 13:
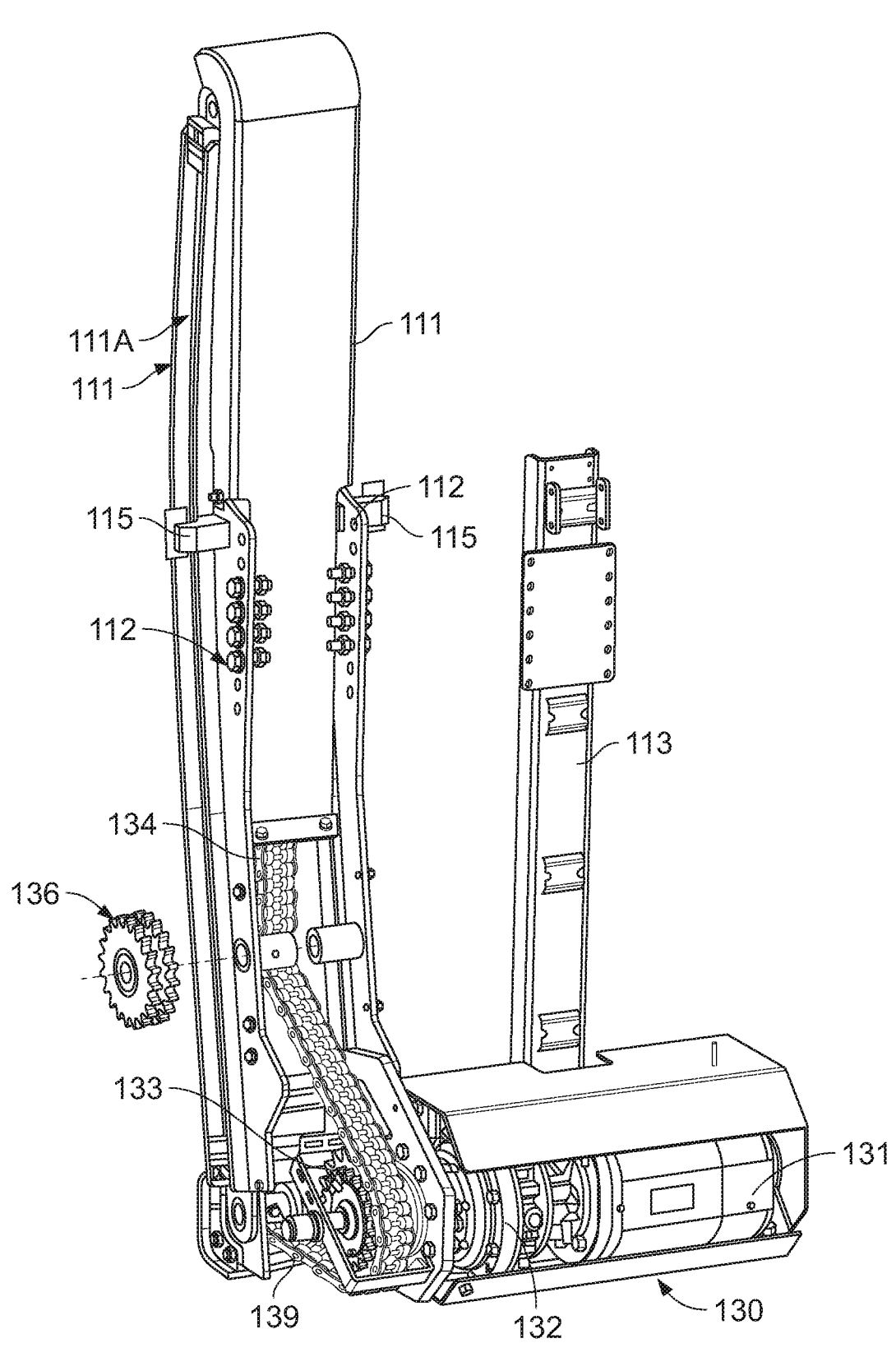
Figure 14:
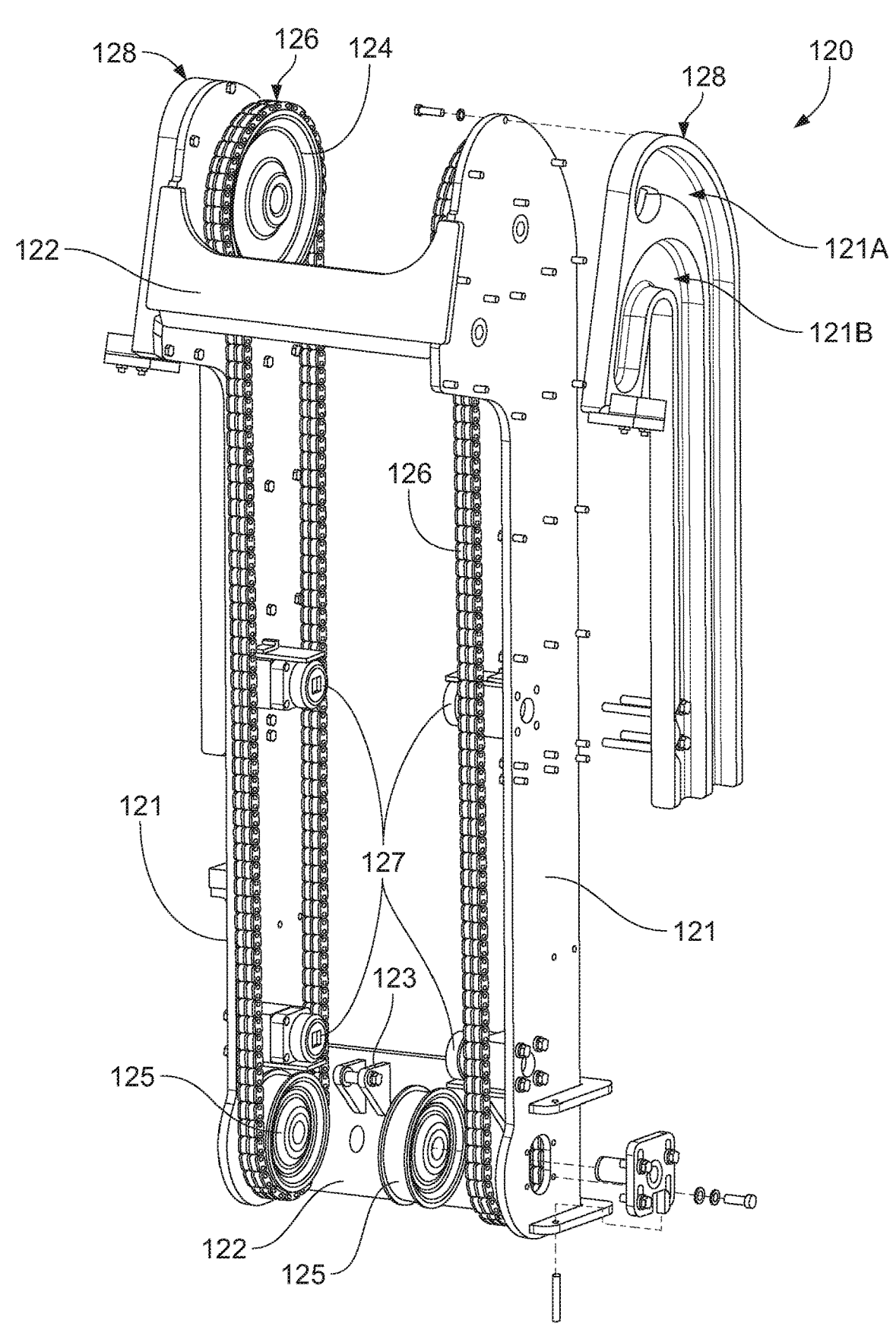
Figure 15:
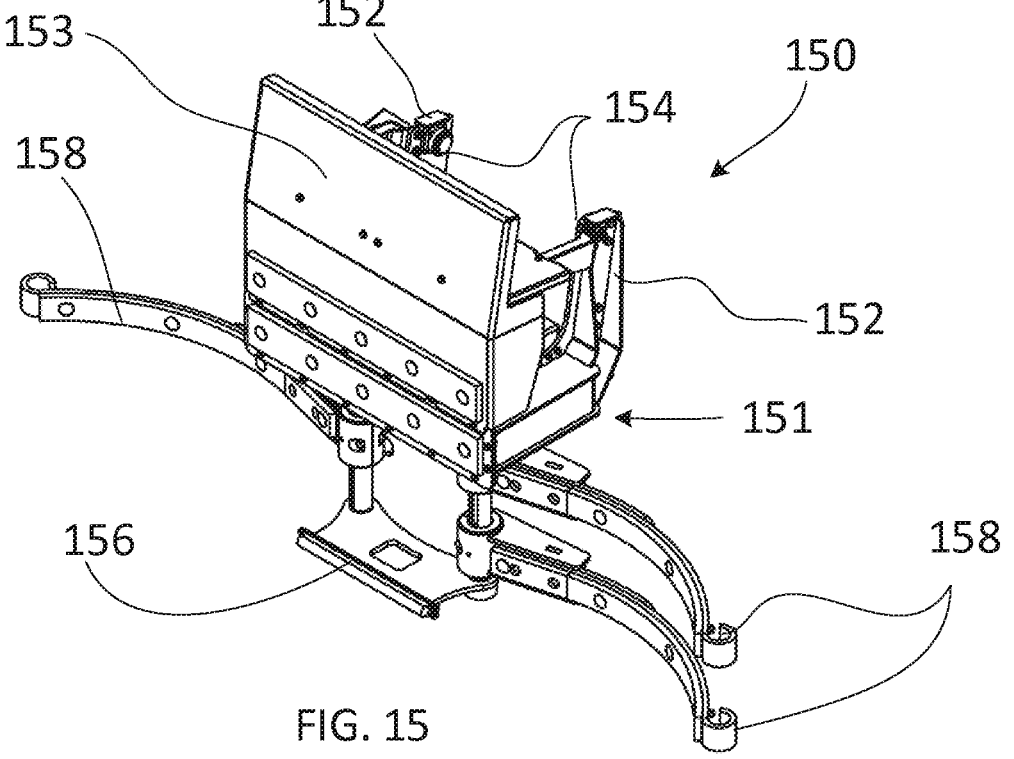
Figure 16:
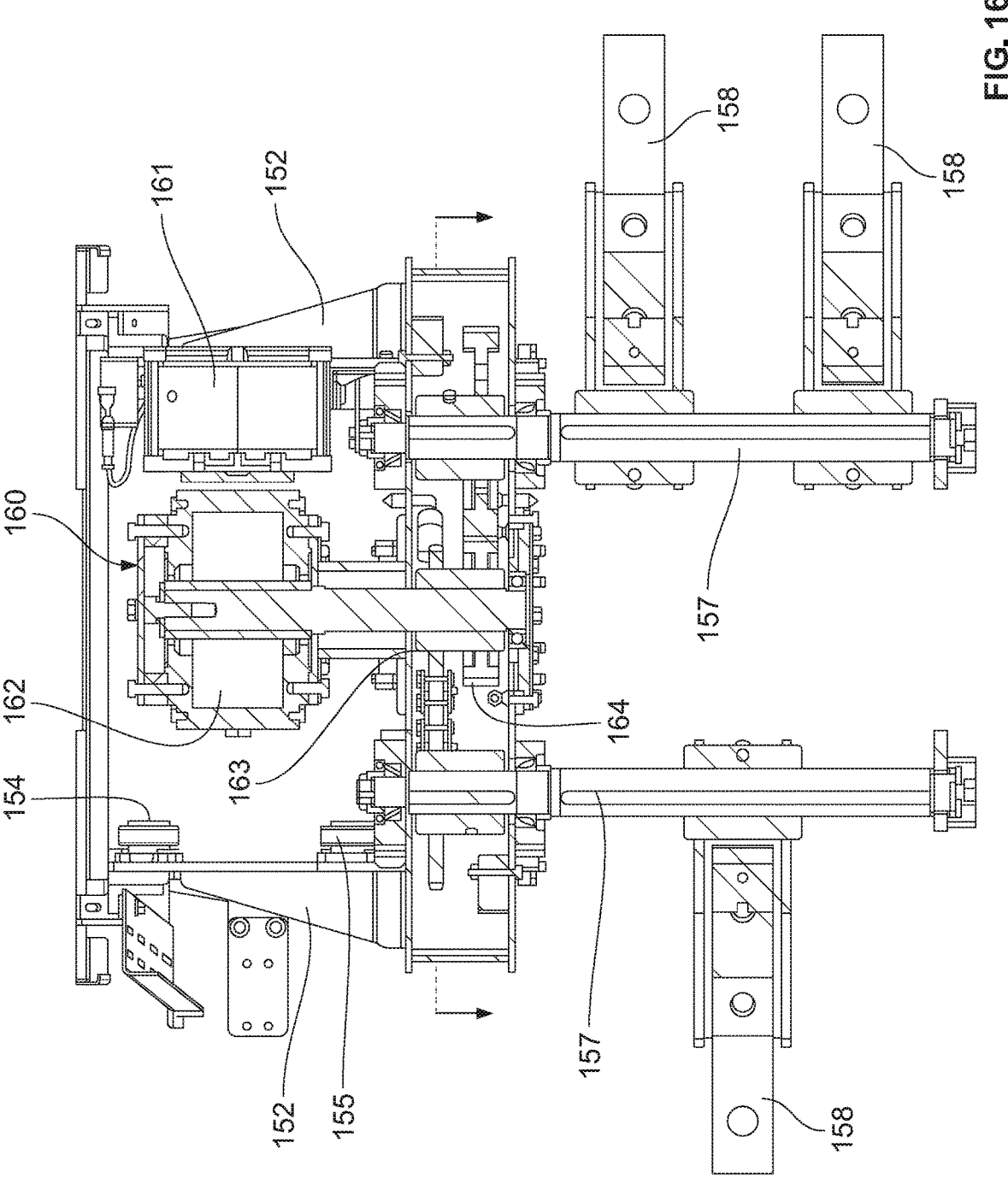

FIG. 13 is a three dimensional rear view of a proximal mast of the exemplary vertical displacement system of FIG. 12;

FIG. 14 is a three dimensional rear view of a distal mast of the exemplary vertical displacement system of FIG. 12;

FIG. 15 is a top three dimensional view of the exemplary grabber system of the mechanical arm of FIG. 2;

FIG. 16 is a cross-sectional view of the grabber system of FIG. 15; and

Figure 17:
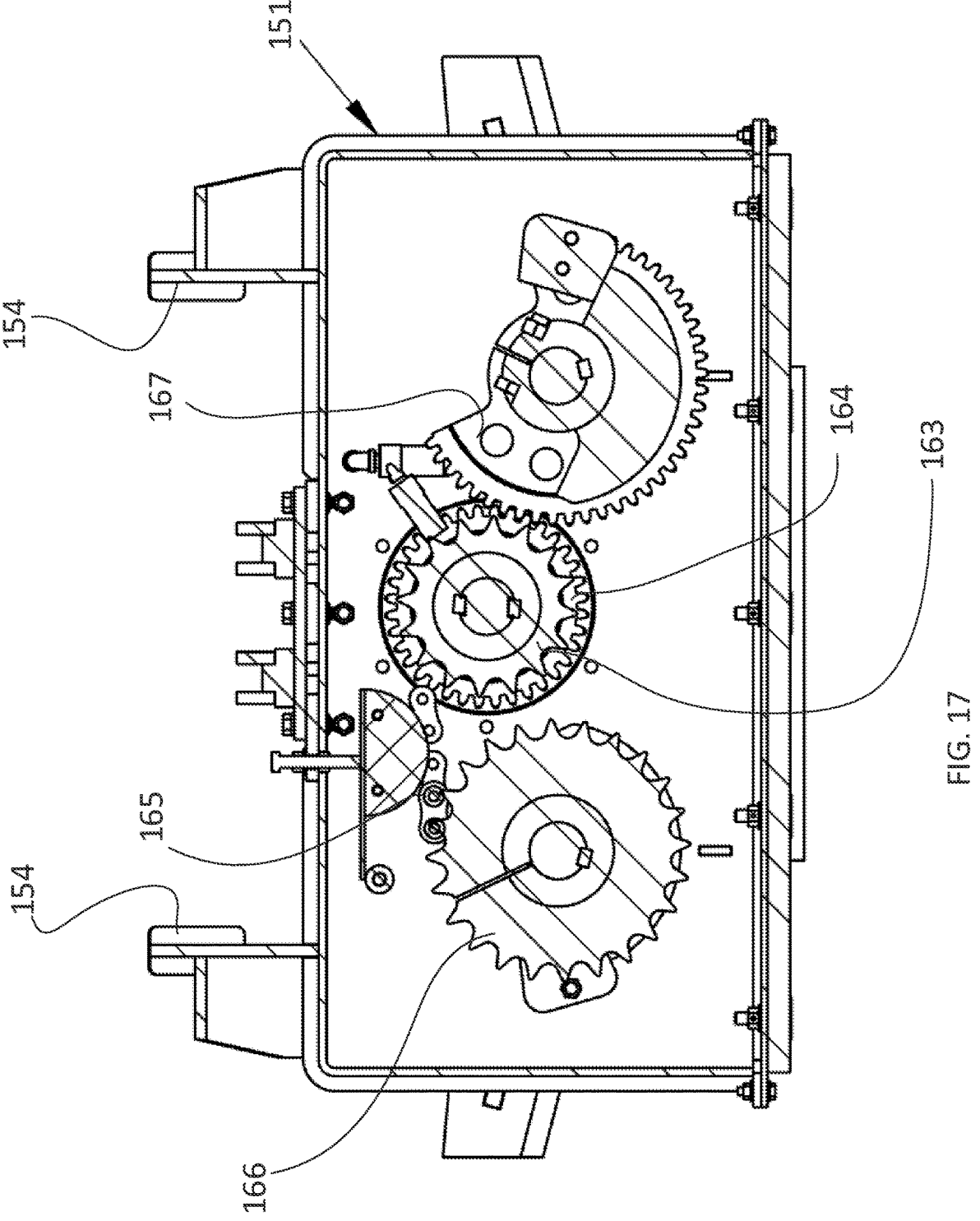

FIG. 17 is another cross-sectional view of the grabber system of FIG. 15.

DETAILED DESCRIPTION

Figure 1:
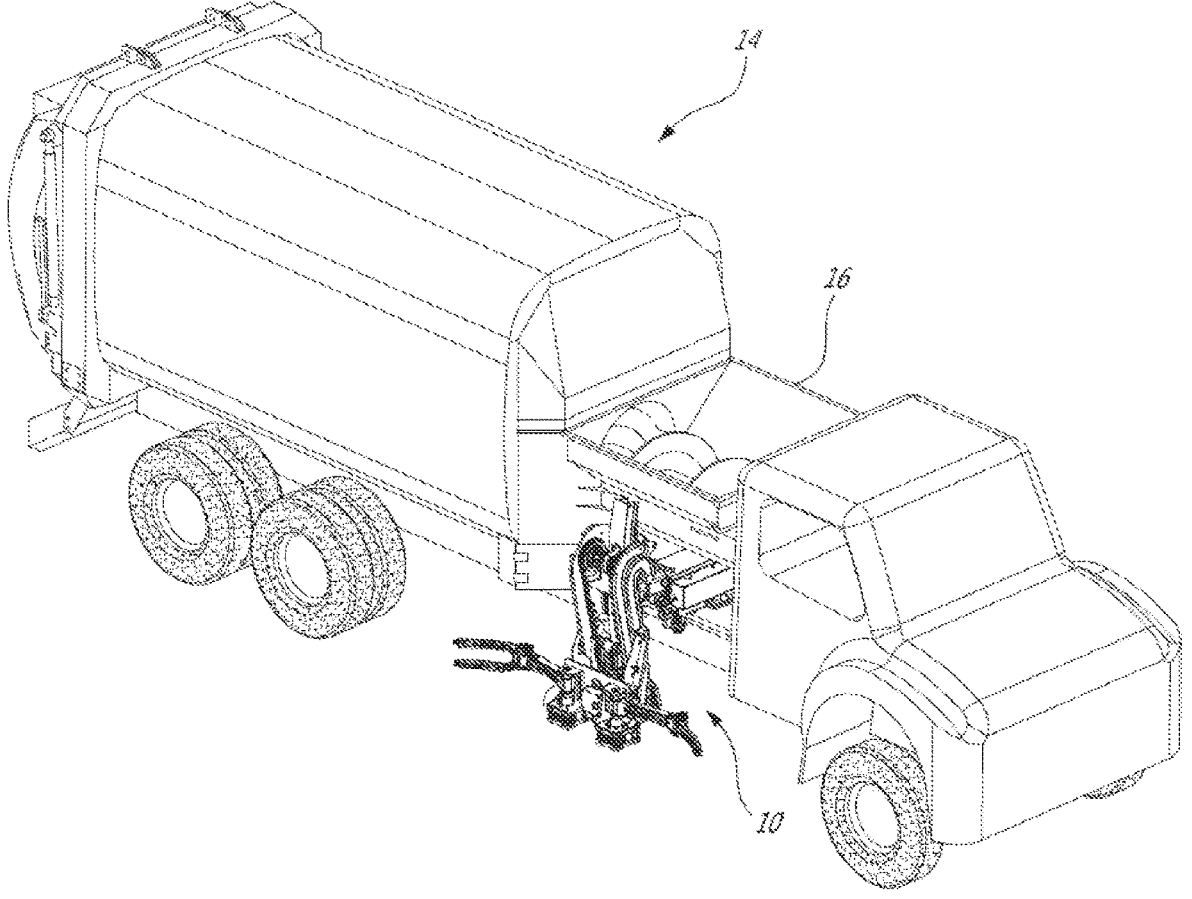
FIG. 1 is a three dimensional view of a garbage collection truck equipped with a mechanical arm in accordance with one embodiment.

Referring generally to FIG. 1, in accordance with an embodiment, there is provided a mechanical arm 10 in accordance with one embodiment mountable to a garbage collection truck 14 to define an automated side loader (ASL) garbage truck performing automated collection of garbage from a garbage receptacle, generally referred to herein as a garbage bins or garbage container. The mechanical arm 10 is designed to provide automated garbage collection with smooth, constant movement (i.e. movement that has minimal jerk/shock) thereby resulting in limited shock stress on the components and leading to high durability. The mechanical arm 10 may be secured to a frame 16 of the truck 14.

Referring to FIG. 2, a mechanical arm 20 in accordance with another embodiment is shown. The mechanical arm, referred below simply as arm 20 includes three systems, namely, a horizontal displacement system 40, a vertical displacement system 100, and a grabber system 150. Each of these systems is described in detail below.

The mechanical arm 20 has a vertical axis V, a transversal axis T normal to the vertical axis V, and a longitudinal axis L normal to both of the vertical and transversal axes V, T. In the present disclosure, the expressions "longitudinally", "transversally", "vertically", "longitudinal", "transversal", and "vertical" are in relation with the longitudinal, transversal, and vertical axes L, T, V.

The different systems of the mechanical arms 20 use chains and sprockets. However, it will be appreciated that any driving member engageable by wheels may be used. For instance, in some embodiments, belts and pulleys may be used. In some embodiments gears, such as rack and pinion gears, may be used without departing from the scope of the present disclosure.

Horizontal Displacement System

Figure 3:
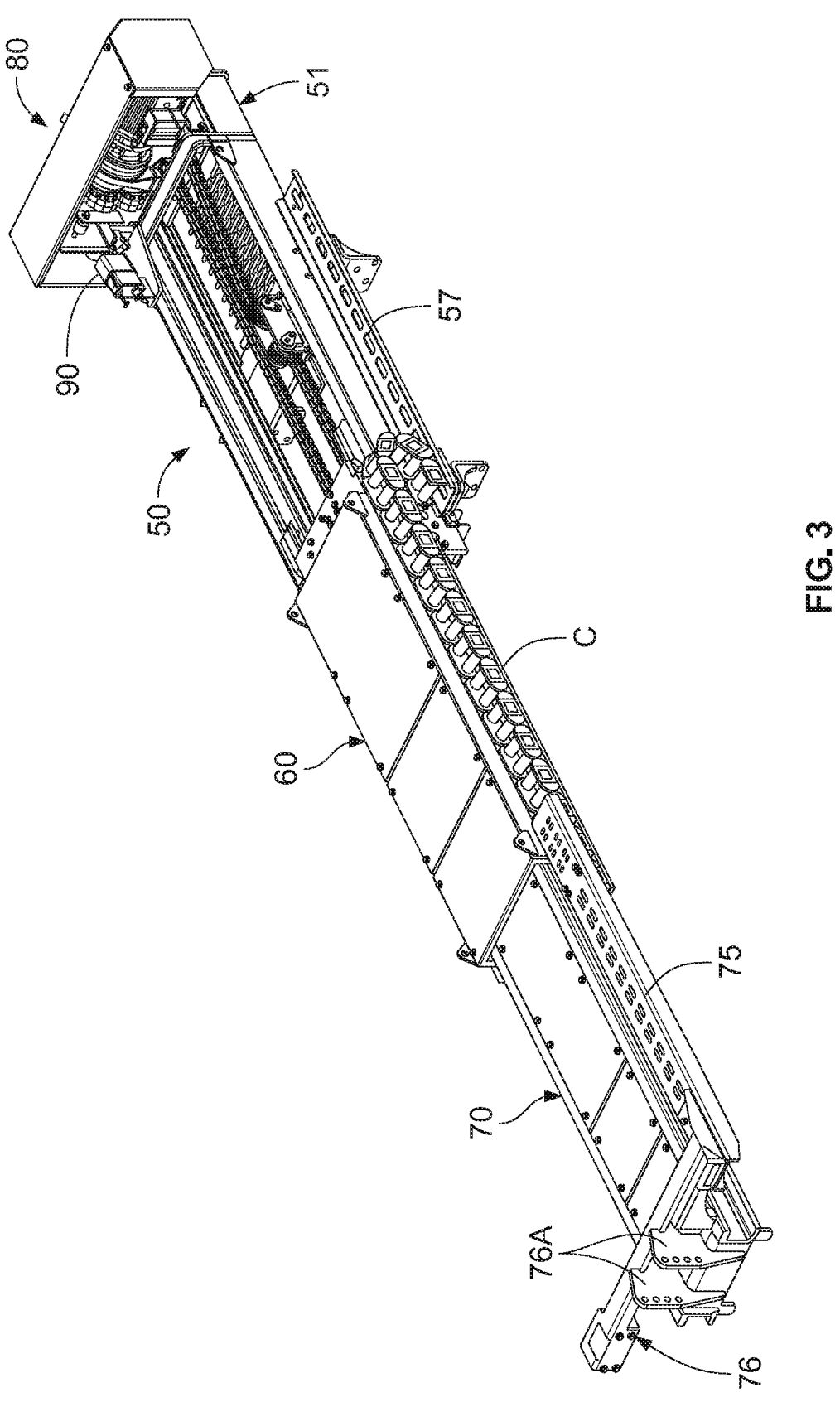
FIG. 3 is a three dimensional top view of an exemplary horizontal displacement system of the mechanical arm of FIG. 2 illustrated in an expanded configuration.
Figure 4:
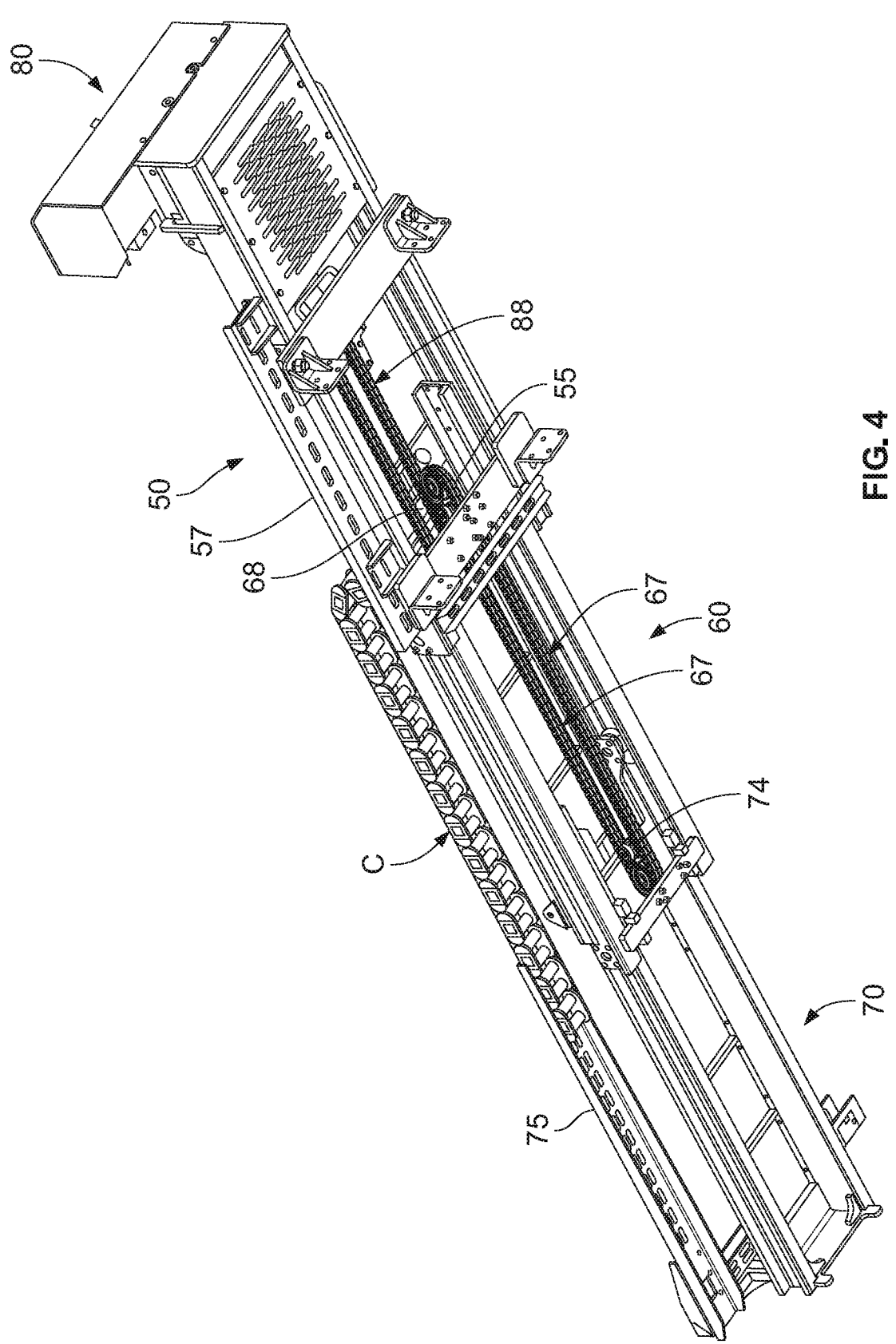
FIG. 4 is a three dimensional bottom view of the exemplary horizontal displacement system of FIG. 3.

Referring to FIGS. 2-9, the horizontal displacement system 40 is described in more detail. The horizontal displacement system 40 includes three sections that are rollingly engaged to one another. The three sections includes a proximal section 50 secured to the frame 16 of the truck 14, an intermediate section 60 rollingly engaged to the proximal section 50, and a distal section 70 rollingly engaged to the intermediate section 60. In the context of the present disclosure, the expression "proximal" and "distal" are in reference to a distance from the truck 14. The three sections 50, 60, 70 are movable one relative to the other between a retracted configuration in which the three sections 50, 60, 70 substantially overlap one another and an expanded configuration in which the three sections 50, 60, 70 are longitudinally offset from one another as depicted in FIG. 3. It will be appreciated that more or less than three sections may be used without departing from the scope of the present disclosure. The deployment of the three sections 50, 60, 70 may increase an effective length of the horizontal displacement system 40 to reach the bin to be emptied in the truck 14.

4

Figure 5:
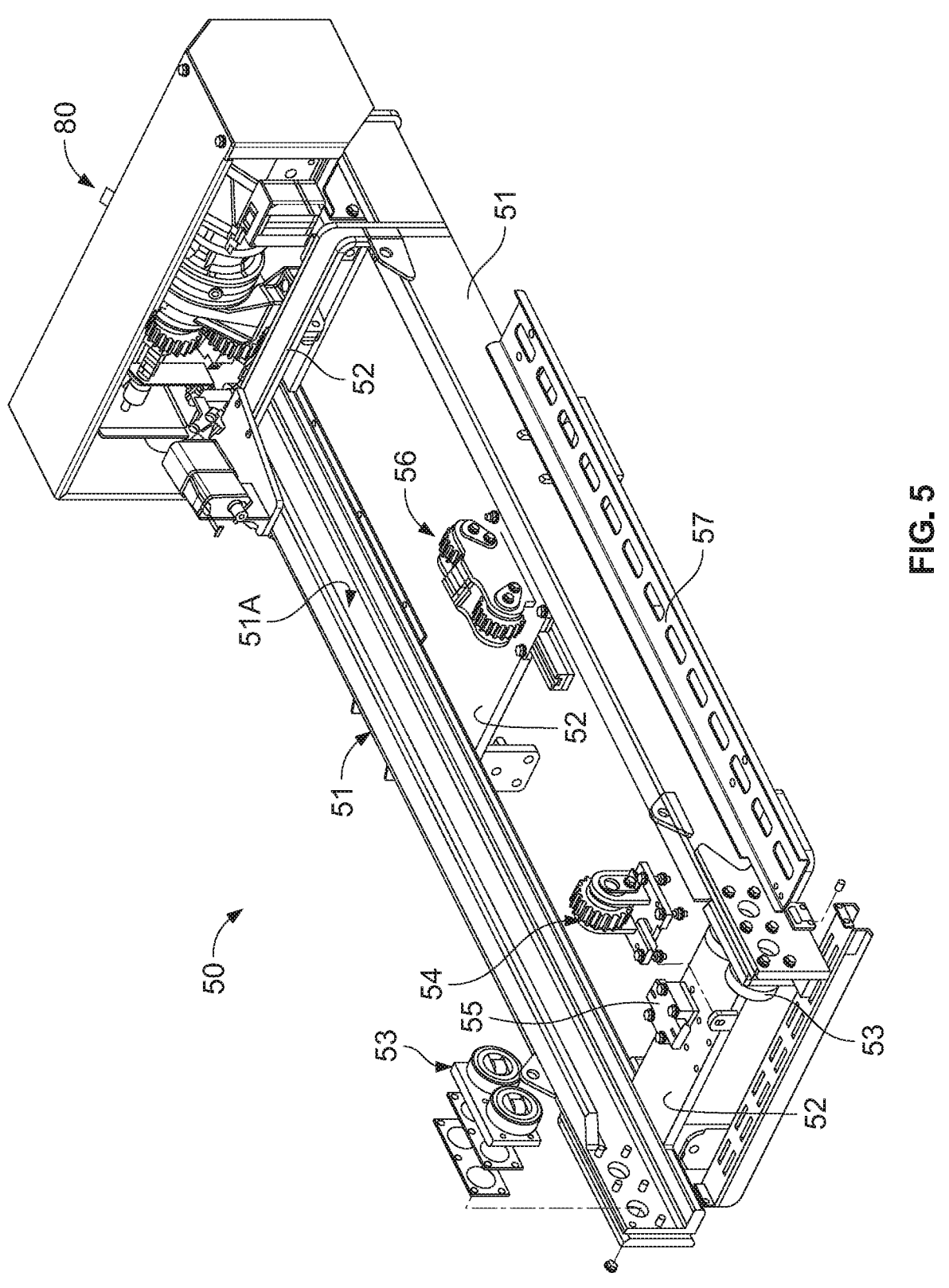
FIG. 5 is a three dimensional partially exploded top view of a proximal section of the exemplary horizontal displacement system of FIG. 3.

Referring more particularly to FIG. 5, the first section 50 has a frame including two rails 51 that are extending longitudinally and that are substantially parallel to one another. The two rails 51 are secured to one another via transverse members 52. Two of the transverse members 52 are located proximate extremities of the two rails 51 and another one of the transverse members 52 is located between the extremities of the two rails 51. It will be appreciated that any other suitable configuration of the frame is contemplated. The two rails 51 define channels 51A for receiving a portion of the second section 60 of the horizontal displacement system 40 as will be discussed further below. The two rails 51 may therefore have a C-shape cross-section, but any other suitable profile is contemplated. Combination bearings 53 are affixed to distal ends of the two rails 51. These combination bearings 53 are used to rollingly engage the second section 60 of the horizontal displacement system 40. Each of the combination bearings includes two bearings rotatable about two axes being normal to one another. In other words, the combination bearings 53 vertically and transversally engage the second section 60 of the horizontal displacement system 40. Any suitable number of combination bearings 53 may be used. The first section 50 includes a first sprocket 54 secured to a distal one of the transverse members 52 and a pair of tensioning sprockets 56 used to maintain a constant tension in a chain wrapped around the first sprocket 54. The pair of tensioning sprockets 56 are mounted on the middle one of the transverse members 52. The tensioning sprockets 56 may be omitted in some configurations. The first section 50 includes a first attachment member 55 that is secured to a distal one of the transverse members 52. The first attachment member 55 is used to secure a chain to the first section 50 as will be described below.

As shown in FIG. 5, the proximate section 50 includes a first cable support 57 secured to one of the two rails 51. The first cable support 57 is used to vertically support cables C (FIG. 3) that are used to electrically connect the grabber system 150 to a power source of the truck 14. The first cable support 57 may define an upwardly oriented channel for receiving said cables C.

Figures 6, 7:
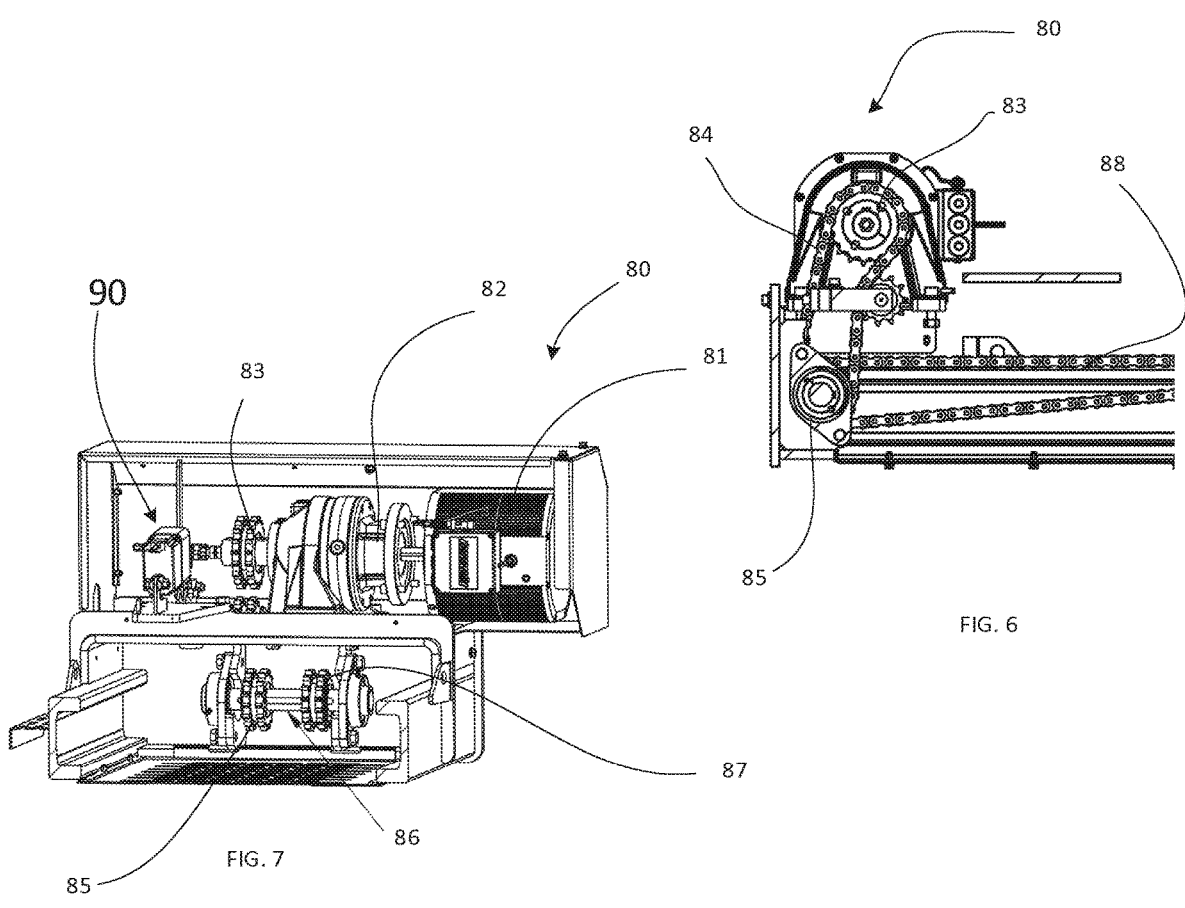
FIG. 6 is a cross-sectional view of the proximal section of FIG. 5 illustrating an exemplary driving mechanism of the horizontal displacement system of FIG. 3.
FIG. 7 is a three dimensional view of the exemplary driving mechanism of FIG. 6.

Referring to FIGS. 5-7, the horizontal displacement system 40 includes a horizontal driving mechanism 80 used to expand and collapse the three sections 50, 60, 70. The horizontal driving mechanism 80 includes a motor 81 in driving engagement with a gearbox 82, although said gearbox may be omitted in certain configurations. The gearbox 82 is drivingly engaged to a driving sprocket 83. A first chain 84 is meshed with the driving sprocket 83 and with a driven sprocket 85 for transmitting a rotational input from the motor 81 to the driven sprocket 85. In other words, and in the embodiment shown, the driven sprocket 85 is drivingly engaged with the motor 81 via the first chain 84, the driving sprocket 83, and the gearbox 82. It will be appreciated that any means for transmitting a rotational input from the motor 81 to the different sections of the horizontal displacement system 40 are contemplated. For instance, gears, strap and pulleys, and so on may be used.

In this embodiment, the motor 81 remains immobile in relationship to the truck 14 during expansion and retraction of the horizontal displacement system 40. This may reduce an inertia of the movable sections, namely the intermediate and distal sections 60, 70 of the horizontal displacement system 40, during extension and contraction. Less stress may be imparted on the different components as a result of having a motor 81 that remains fixed relative to the truck 14.

Lifespan of the different components may be enhanced because of this configuration.

As shown more particularly on FIGS. 6-7, the driven sprocket 85 is coaxially mounted on an axle 86 and a second driven sprocket 87 is also coaxially mounted on the axle 86. Hence, the driven and second driven sprocket 85, 87 are engaged to each other via the axle 86. But, any other suitable engagement means are contemplated. The second driven sprocket 87 is meshed with a second chain 88. The second chain 88 is meshed with the second driven sprocket 87, the first sprocket 54 mounted on the transverse member 52 of the proximal section 50 and meshed with the pair of tensioning sprockets 56 mounted on the other transverse member 52. The second chain 88 is thus drivingly engaged to the motor 81.

Figure 8:
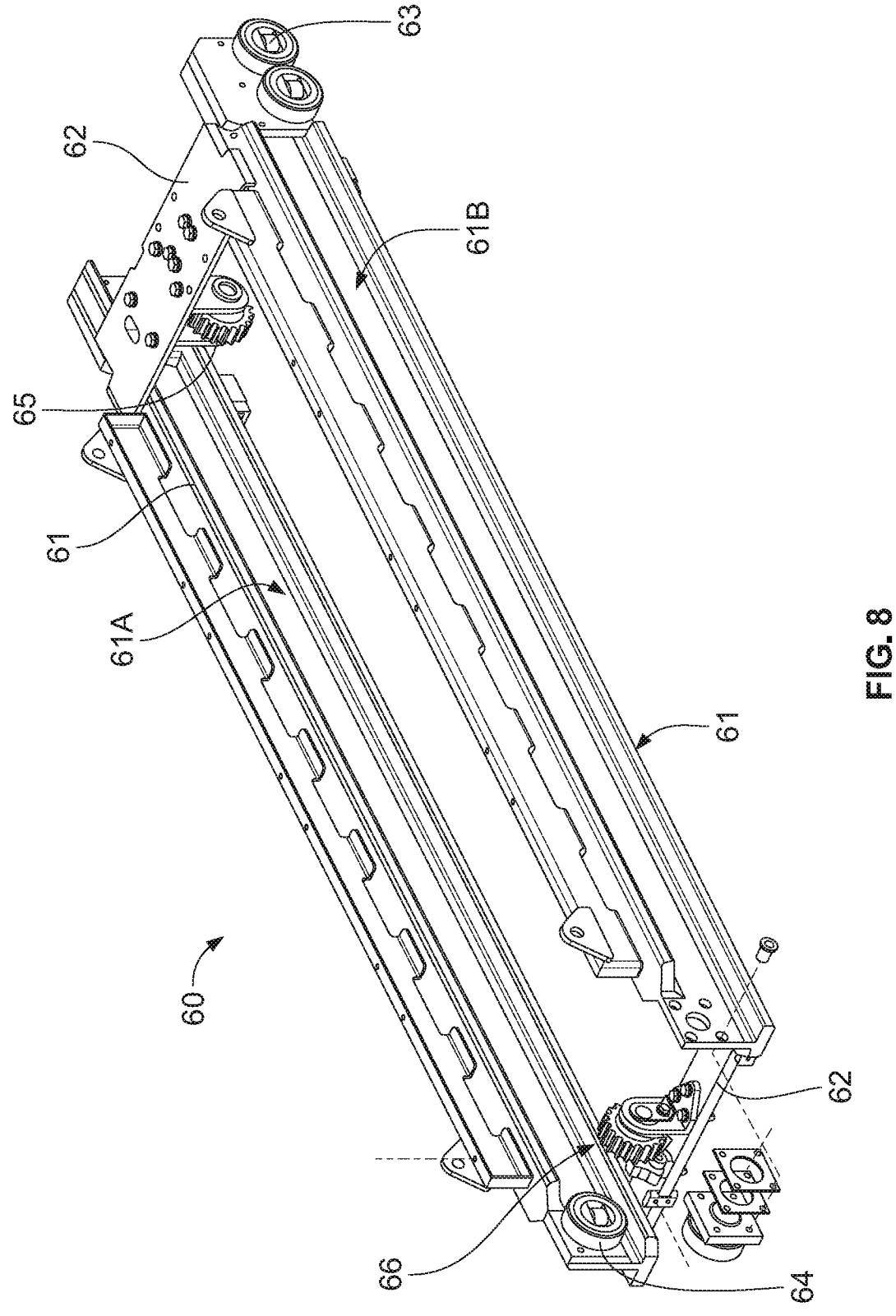
FIG. 8 is a top three dimensional view of an intermediate section of the exemplary horizontal displacement system of FIG. 3.

Referring now to FIG. 8, the intermediate section 60 is described in more detail. The intermediate section 60 has a frame including two rails 61 that are extending longitudinally and that are substantially parallel to one another. The two rails 61 are secured to one another via transverse members 62 dispose at respective opposite ends of the two rails 61. The two rails 61 define inner channels 61A for receiving a portion of the distal section 70 of the horizontal displacement system 40 as will be discussed further below. The two rails 61 further define outer channels 61B for receiving the combination bearings 53 of the proximal section 50. The two rails 61 may therefore have a H-shape cross-section, but any other suitable profile is contemplated. Proximal combination bearings 63 are affixed to proximal ends of the two rails 61. The proximal combination bearings 63 are rollingly received within the channels 51A of the rails 51 of the proximal section 50. Distal combination bearings 64 are affixed to distal ends of the two rails 51. Any suitable number of combination bearings 63, 64 may be used. The intermediate section 60 includes a second sprocket 65 mounted to a proximal one of the transverse members 62 and a third sprocket 66 mounted to a distal one of the transverse members 62. A third chain 67 (FIG. 4) is meshed with the second and third sprockets 65, 66. The intermediate section 60 is secured to the second chain 88 of the horizontal driving mechanism 80 such that, in use, the rotation of the second chain 88 of the horizontal driving mechanism 80 via actuation of the motor 81 results in the second chain 88 rotating around the second driven sprocket 87 and entraining with it the intermediate section 60 of the horizontal displacement system 40 such that the intermediate section 60 moves longitudinally relative to the proximal section 50. In the embodiment shown, a second attachment member 68 (FIG. 4) secured to a proximal one of the transverse members 62 and is used to affix the third chain 88 to the intermediate section 60 of the horizontal displacement system 40.

Figure 9:
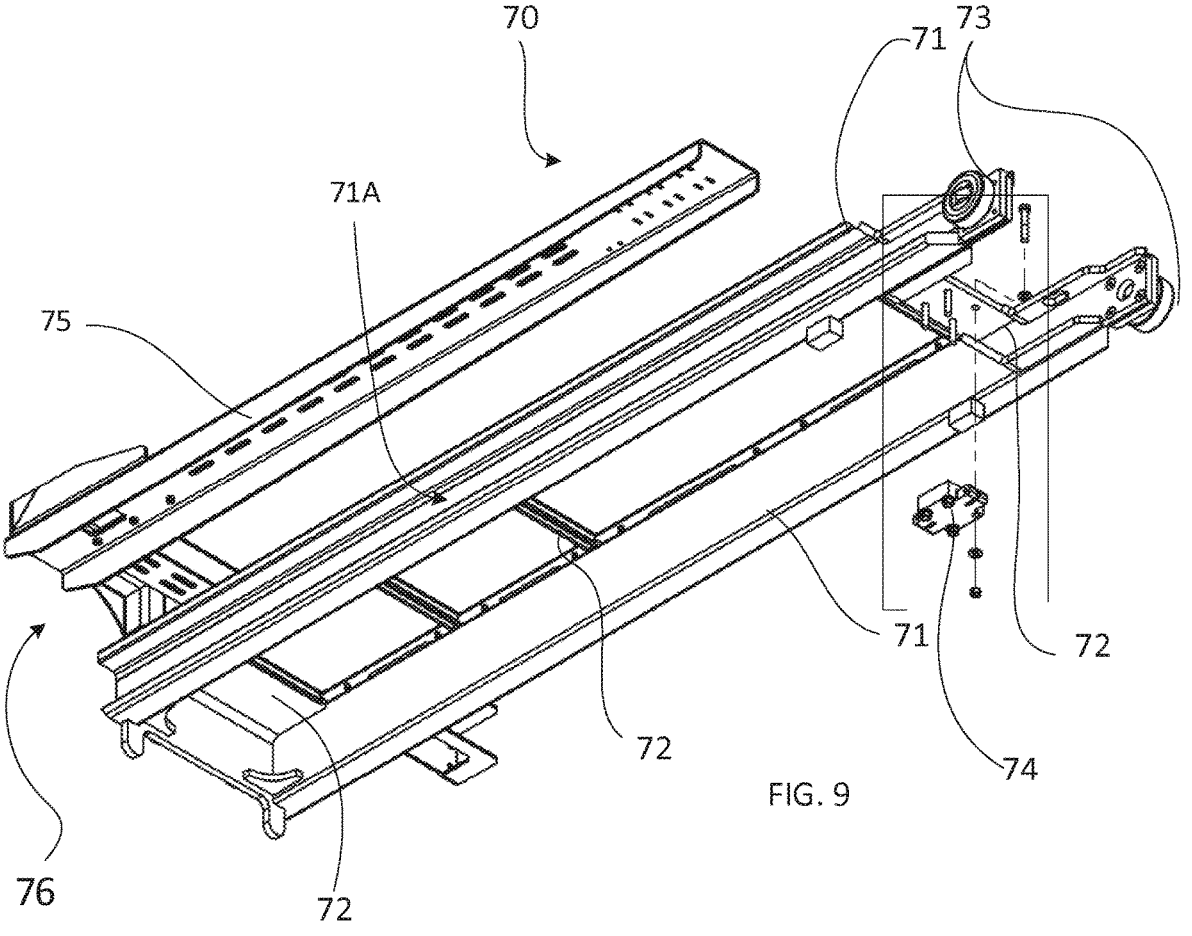
FIG. 9 is a bottom three dimensional view of a distal section of the exemplary horizontal displacement system of FIG. 3.

Referring now to FIG. 9, the distal section 70 is described in more detail. The distal section 70 has a frame including two rails 71 that are extending longitudinally and that are substantially parallel to one another. The two rails 71 are secured to one another via transverse members 72. The two rails 71 define outer channels 71A for receiving the distal combination bearings 64 of the intermediate section 60. The two rails 71 may therefore have a C-shape cross-section, but any other suitable profile is contemplated. Proximal combination bearings 73 are affixed to proximal ends of the two rails 71. The proximal combination bearings 73 are rollingly received within the inner channels 61A of the rails 61 of the intermediate section 60. A third attachment member 74 is secured to a proximal one of the transverse members 72. The third attachment member 74 is used to secure the distal section 70 to the third chain 67 of the intermediate section 60.

The distal section 70 includes a second cable support 75 secured to one of the two rails 51. The second cable support 75 is used to vertically support cables C that are used to electrically connect the grabber system 150 to the power source of the truck 14. As shown in FIG. 2, in the retracted configuration of the horizontal displacement system 40, the cable C are disposed vertically between the first cable support 57 of the proximate section 50 and the second cable support 75 of the distal section 70. The second cable support 75 may define a downwardly oriented channel for receiving said cables C.

As shown in FIGS. 3 and 9, the distal section 70 further includes a mount 76 for securing the grabber system 150 to the horizontal displacement system 40. The mount 76 may include two, although more or less is contemplated, brackets 76A (FIG. 3) for securing the vertical displacement system 100 via suitable fasteners or any other suitable securing means.

Figure 10:
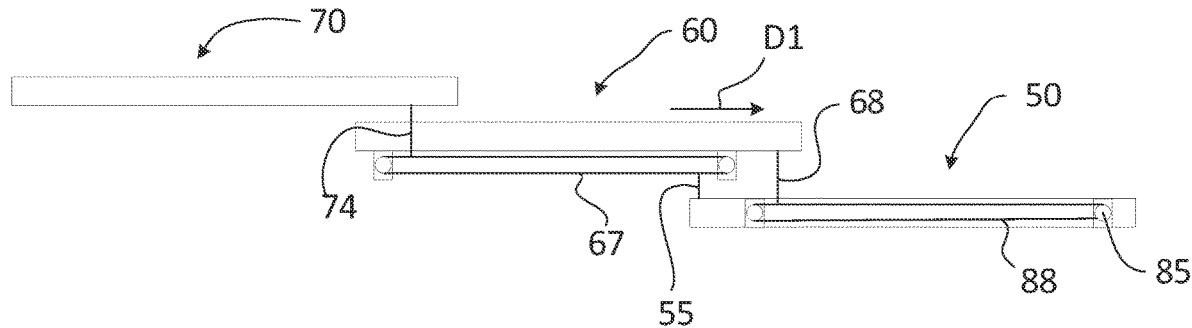
FIG. 10 is a schematic side view of the exemplary horizontal displacement system of FIG. 3.

Referring now to FIG. 10, the three sections 50, 60, 70 of the horizontal displacement system 40 are shown schematically and in the expanded configuration. In use, when the motor 81 is powered to move the three sections 50, 60, 70 in the retracted position of the horizontal displacement system 40, the driven sprocket 85 is rotated in a clockwise direction thereby entraining with it the second chain 88, which also rotates in a clockwise direction. This has the effect of pulling on the second attachment member 68 thereby moving the intermediate section 60 along direction D1 relative to the proximal section 50. In the embodiment shown, the second attachment member 68 connects the intermediate section 60 to a top half of the second chain 88. The third chain 67 is secured to the proximate section 50 via the first attachment member 55. Herein, the first attachment member 55 connects the proximate section 50 to a bottom half of the third chain 67. Hence, when the intermediate section 60 is moved along direction D1 relative to the proximate section 50, the third chain 67 is rotated in a clockwise direction to be able to permit the movement of the intermediate section 60. By rotating, the third chain 67 entrains with it the distal section 70 via the third attachment member 74, which herein connects a top half of the third chain 67 to the distal section 70. Hence, the distal section 70 moves relative to the intermediate section 60 along the direction D1.

During expansion and retraction of the horizontal displacement system 40, the proximal and intermediate sections 50, 60 move one relative to the other at a first velocity and the intermediate and distal sections 50, 60 move one relative to the other at a second velocity, which may be equal to the first velocity. Therefore, in use, the distal section 70 moves relative to the proximate section 50 at a velocity corresponding to a sum of the first and second velocities. If the first and second velocities are equal, the distal section 70 moves twice as fast as the intermediate section 60. Therefore, expansion and contraction of the intermediate and distal sections 50, 60 may occur simultaneously such that the intermediate and distal sections 50, 60 reach their final position (e.g., expanded or retracted) substantially at the same time. Speed and efficiency gains may therefore be achieved with the disclosed configuration. Moreover, the disclosed configuration may require a single motor to move both of the intermediate and distal sections 60, 70. The distal section 70 is therefore engaged to the motor via the intermediate section 60.

It will be understood that the attachment members may be secured to the chains at any other suitable locations. Variations of the disclosed horizontal displacement system 40 are contemplated and are within the scope of the present disclosure. For instance, the second attachment member 68 need not be secured to the top half of the second chain 88 and may be secured to a bottom half of the second chain 88. In such a case, the motor 81 is rotated in the opposite direction such that the driven sprocket 85 rotates counter clockwise. Similar modifications are contemplated for the first and third attachment members 55, 74. It will be understood that the attachment members encompass any means via which the chains may be affixed to the different sections of the horizontal displacement system 40. The attachment members may include, for instance, fasteners, a weld joint, and so on.

Figure 11:
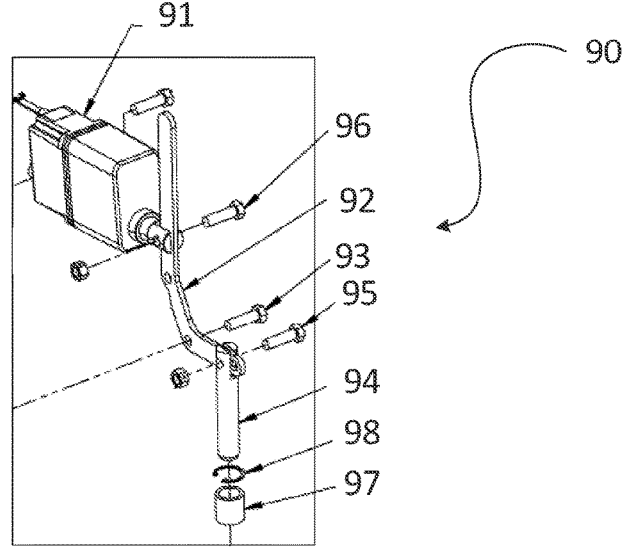
FIG. 11 is a three dimensional partially exploded view of a locking device of the exemplary horizontal displacement system of FIG. 3.

Referring now to FIGS. 7 and 11, the horizontal displacement system 40 includes a locking device 90 used for locking the three sections 50, 60, 70 together in the retracted configuration to avoid undesired deployment, for instance, when the truck 14 is moving. The locking device 90 includes an actuator 91 having a moving member pivotally engaged to a lever 92 via a pivot 96. The lever 92 is pivotally mounted on a second pivot 93. The lever is pivotally mounted to a locking bar 94 via a third pivot 95. The actuator 91, which may be a linear actuator, a solenoid, a pneumatic actuator, a hydraulic actuator or any other suitable actuation means, is powered to push the lever 92 thereby pushing the locking bar 94 downwardly. The locking bar 94 may therefore be inserted through registering apertures defined by the three sections 50, 60, 70 of the horizontal displacement system 40 to lock them together. When it is required to expand the horizontal displacement system 40, the actuator 91 may be powered to pull on the lever 92 to lift the locking bar 94 upwardly thereby unlocking the three sections 50, 60, 70. Any other suitable locking means is contemplated without departing from the scope of the present disclosure. For instance, hooks may be used to restrain movements of the sections 50, 60, 70. A wearing ring 97 secured to the locking bar 94 via a clip 98 may be used to minimize wear and tear of the locking bar 94.

Vertical Displacement System

Referring now to FIGS. 12-14, the vertical displacement system 100 is described in more detail. The vertical displacement system 100 includes a proximal mast 110 and a distal mast 120. The proximal mast 110 is secured to the distal section 70 of the horizontal displacement system 40 and is therefore non-movable relative to said distal section 70. The proximal mast 110 is carrying a vertical driving mechanism 130 used to expand the vertical displacement system 100 from a low position depicted in FIG. 2 to a high or elevated position to lift the grabber system 150, and a bin held by the grabber system 150, above an opening of the truck 14 via which the contents of the bin may be poured in the truck 14.

Referring more particularity to FIG. 13, the proximal mast 110 includes two vertical rails 111 each defining a channel 111A for receiving a portion of the distal mast 120 as will be described below. A single rail defining one or more channel may alternatively be used. Two brackets 112 are secured to the two vertical rails 111 and are used to secure the proximal mast 110 to the two brackets 76A of the distal section 70 of the horizontal displacement system 40. In the embodiment shown, the channels 111A define a curved profile. This may help in assisting the lifting of the bin and in properly orienting the bin for pouring its content in the truck 14. More detail about such a system is provided in U.S. Patent Application Publication No.: US 2021/0122568, the entire contents of which are incorporated by reference herein in their entirety. The proximal mast 110 further includes two fourth attachment members 115.

The vertical driving mechanism 130 includes a motor 131, such as an electric motor but any other suitable motor may be used, a gearbox 132 drivingly engaged by the motor 131, and a driving sprocket 133 drivingly engaged to the gearbox 132. In other words, the driving sprocket 133 is engaged to the motor 131 via the gearbox 132. In some embodiments, the gearbox 132 may be omitted. The driving sprocket 133 is meshed with a fourth chain 134 that meshes with a driven sprocket 135 (FIG. 12) located at a vertical upper end of the proximal mast 110. A tensioning sprocket 136 and an idler sprocket 139 may be used and meshed with the fourth chain 134 to maintain adequate tension in the fourth chain 134 and to adequately guide the fourth chain 134. The motor 131 and the gearbox 132 are secured proximate a bottom vertical end of the proximal mast 110. Hence, as will be further explained below, in use, the motor 131 does not move vertically during the elevation of the vertical displacement system 100. This may result in efficiency and speed gains because the motor 131 does not need to move its own weight. The different components of the arm 20 may exhibit less wear and tear because of the reduced weight having to be moved up and down.

As shown in FIG. 12, a mounting member 137 may be secured to the fourth chain 134 to move with the fourth chain 134 when the motor 131 is actuated. The mounting member 137, which may be a bracket, is used to secure the distal mast 120 to the fourth chain 134 such that when the fourth chain 134 is rotated about the driving and driven sprockets 133, 135, the distal mast 120 moves with it in a vertical direction to increase and decrease a height of the bin held by the grabber system 150. Biasing members 138, such as springs, may be used to connect the mounting member 137 to the fourth chain 134 such that movements transmitted from the fourth chain 137 to the grabber system 150 may be smoother. However, the biasing members 138 may be omitted.

As shown in FIG. 12, the proximal mast 110 may include a third cable support 113 for supporting cables that electrically connects the motor 131 of the vertical displacement mechanism 130 to the power source of the truck 14. The third cable support 113 may extend substantially vertically and may define channel for accepting the cables C.

Referring now to FIG. 14, the distal mast 120 is described in more detail. The distal mast 120 extends substantially vertically and includes a frame having two vertical members 121 secured to one another via two transverse members 122. A bottom one of the two transverse members 122 defines brackets 123 via which the distal mast 120 is attached to the mounting member 137, which is secured to the fourth chain 134. Hence, movements of the fourth chain 134 entrains the distal mast 120 via the attachment the mounting member 137 to the bottom one of the transverse members 122.

In the embodiment shown, the distal mast 120 includes two upper idler sprockets 124 and two lower idler sprockets 125. Each of the upper idler sprockets 124 is pivotally mounted to an upper and of a respective one of the two vertical members 121. Each of the two lower idler sprockets 125 is pivotally mounted to a lower end of a respective one of the two vertical members 121. The distal mast 120 includes two fifth chains 126 each being meshed with a respective one of the two upper idler sprockets 124 and with a respective one of the two lower idler sprockets 125. The two fifth chains 126 are secured to the proximal mast 110 each via a respective one of the two fourth attachment members 115. The two fifth chains 126 are further secured to a transversal member 129 (FIG. 12) that is used for securing the grabber system 150 to the vertical displacement system 100.

The distal mast 120 includes combination bearings 127, two combination bearings secured to one of the two vertical members 121 and two combination bearings secured to the other of the two vertical members 121. The combination bearings 127 are rollingly engaged within the channels 111A of the two vertical rails 111 of the proximal mast 110. The combination bearings 127 therefore assist in vertical movement of the distal mast 120 in relationship with the proximal mast 110.

In the depicted embodiment, each of the two vertical members 121 defines two channels, namely a fore channel 121A and a rear channel 121B, for receiving a portion of the grabber system 150 as will be discussed below. The channels 121A, 121B have substantially straight portions from a bottom of the channels 121A, 121B and curved portions extending upwardly from the straight portions. The two channels 121A, 121B of each of the two vertical members 121 are offset from one another and are used to tilt the grabber system 150 to empty the content of the bin held by said grabber system 150. More detail about this configuration are presented in U.S. Patent Application Publication No.: US 2021/0122568, the entire contents of which are incorporated by reference herein in their entirety. In the embodiment shown, the channels 121A, 121B are defined by plates 128 secured to the vertical members 121, but this need not be the case and the vertical members 121 may themselves define the channels 121A, 121B.

In use, when the motor 131 is powered, the fourth chain 134 is rotated thereby entraining the distal mast 120 via the fourth chain 134 and the mounting member 137. This vertical movement of the distal mast 120 relative to the proximal mast 110 induces a rotation of the two fifth chains 126 because they are secured to the proximal mast 110 via the fourth attachment members 115 (FIG. 13). The rotation of the two fifth chains 126 induces a vertical movement of the grabber system 150 relative to the distal mast 120 because the two fifth chains 126 are secured to the grabber system 150 via the transverse member 129, which is secured to the two fifth chains 126. The same principles explains above with reference to FIG. 10 apply herein as well. Hence, the grabber assembly 150 moves vertically twice as fast as the distal mast 120 relative to the proximal mast 110. It will be appreciated that the two fourth attachment members 115 and the transverse member 129 are respectively secured to opposed locations on the two fifth chains 126 such that two fourth attachment members 115 and the transverse member 129 move in opposite directions relative to the distal mast 120.

Moreover, thanks to the motor 131 and gearbox 132 secured to the proximal mast 110, less weight has to be lifted by said motor 131 during the vertical extension of the grabber system 150. This may result in efficiency and speed gains as well as less wear and tear on the different components of the arm 20. Moreover, the disclosed system is such that both of the distal mast 120 and the grabber system 150 reaches their final position (either retracted or expanded) at substantially the same time.

Grabber System

Referring now to FIGS. 15-17, the grabber system 150 is described in more detail. The grabber system 150 includes a frame 151 that is secured to the transverse member 129 (FIG. 12) of the vertical displacement system 100. The frame 151 has two members 152 secured to a front plate 153. The front plate 153 may be used as a bumper sized to be in contact with the bin to be emptied. Upper combination bearings 154 are secured to upper ends of the two members 152 and ride within the rear channels 121B of the two vertical members 121 of the distal mast 120. Lower combination bearings 155 are secured to lower ends of the two members 152 and ride within the fore channels 121A of the two vertical members 121.

The grabber system 150 includes a grapping driving mechanism 160 having a motor 161, such as an electric motor and a gearbox 162, although the gearbox 162 may be omitted in some configurations. The gearbox 162 is engaged to two shafts 157 that extend substantially vertically downwardly from the frame 151. The two shafts 157 may be pivotally mounted to a bottom plate 156 for added stiffness. Fingers 158 are secured to the two shafts 157, for instance via spline connections, and are rotatable with the two shafts 157 to grab the bin and release the bin. The two fingers 158 may be pivotally mounted to the frame 151. In the embodiment shown, the fingers 158 includes two fingers secured to one of the two shafts 157 and one finger secured to the other of the two shafts 157; the one finger being vertically between the two fingers to avoid creating a moment on the bin when grabbing said bin. It will be appreciated that any number of fingers (e.g., 2, 4, etc) is contemplated.

Referring now to FIG. 17, the grapping driving mechanism 160 is described in more detail and has driving sprocket 163 mounted coaxially with a driving gear 164. The driving sprocket 163 and the driving gear 164 are both drivingly engaged to the motor 161, herein via the gearbox 162. The driving sprocket 163 is meshed with a sixth chain 165 that is meshed with a driven sprocket 166. The driven sprocket 166 is engaged to one of the two shafts 157 (FIG. 16). The driving gear 164 is meshed with a driven gear 167, which is engaged to the other of the two shafts 157.

Therefore, in use, rotation of the driving sprocket 163 and of the driving gear 164 in a clockwise direction results in a rotation of the driven gear 167 in a counter clockwise direction and in the driven sprocket 166 rotating in a clockwise direction. This results in the fingers 158 extending away from one another to open the grabber system 150 up to a point where the fingers 158 define a sufficient space between them to receive the bin to be emptied. The rotation of the driving sprocket 163 and of the driving gear 164 in the counter clockwise direction results in the fingers 158 moving towards one another to seize the bin for the lifting and emptying phase.

The disclosed driving mechanism 160 therefore permits the use of a single motor 161, and of a single gearbox 162 in some embodiments, to operate all of the fingers 158. This may provide weight savings compared to traditional systems in which each fingers is coupled to a respective actuator (e.g., hydraulic actuators) or a respective motor. These weight savings permitted by the use of the single motor 161 may allow efficiency gains since less weight has to be lifted up and down by the vertical displacement system 100 and may decrease the wear and tear on the different components since less weight has to be carried by the horizontal displacement system 40 and by the vertical displacement system 100.

As can be seen therefore, the examples described above and illustrated are intended to be exemplary only. The scope is indicated by the appended claims.

What is claimed is:

1. A mechanical arm of a garbage truck, the mechanical arm comprising:

a first mast;

a second mast engaged to the first mast and movable relative to the first mast in a direction being substantially perpendicular to a ground surface;

at least two sprockets pivotally mounted on the first mast, wherein the at least two sprockets comprise two first sprockets pivotally mounted on the first mast;

two second sprockets pivotally mounted on the second mast;

a first chain forming a closed loop extending around the at least two sprockets, the first chain engaged to the second mast;

a second chain looped around the two second sprockets;

a grabber system mounted to the second mast, the grabber system having at least two actuated fingers for holding a bin to be discharged in the garbage truck, wherein the first chain is engaged to the grabber system via the second chain; and a motor drivingly engaged to the second mast via the first chain and operable to move the second mast and the grabber system relative to the first mast between a low position and a high position, a height of the grabber system greater in the high position than in the low position, wherein the motor is mounted to the first mast and remains substantially at a constant height between the low and high positions of the second mast.

2. The mechanical arm of claim 1, wherein the second chain is fixed to the first mast at a first location and fixed to the grabber system at a second location, the first location located on a first vertically oriented span of the second chain, and the second location located on a second vertically oriented span of the second chain, such that a first movement of the first location relative to the second mast in a first direction translates into a second movement of the second location relative to the second mast in a second direction opposite the first direction.

3. The mechanical arm of claim 2, further comprising a mounting member secured to the first chain, wherein the second chain is fixed to the first mast at the first location via the mounting member.

4. The mechanical arm of claim 3, wherein the mounting member comprises a bracket.

5. The mechanical arm of claim 3, further comprising biasing members that connect the mounting member to the first chain.

6. The mechanical arm of claim 1, wherein the motor is a first motor, and wherein the mechanical arm further comprises a horizontal displacement system comprising:

a proximal arm section securable to a frame of the garbage truck;

a distal arm section engaged to the proximal arm section and movable relative to the proximal arm section in a direction being substantially parallel to a ground surface; and a second motor drivingly engaged to the distal arm section and operable to move the distal arm section relative to the proximal arm section between a retracted configuration in which the proximal and distal arm sections overlap one another and an expanded configuration in which at least a portion of the distal arm section is offset from the proximal arm section, wherein the second motor is mounted to the proximal arm section and remains immobile relative to the frame of the garbage truck between the retracted configuration and the expanded configuration.

7. The mechanical arm of claim 6, wherein:

the proximal arm section defines a first aperture;

the distal arm section defines a second aperture;

when the distal arm is in the retracted configuration, the first and second apertures are coaxially aligned; and the horizontal displacement system further comprises a locking device configured to, when the distal arm section is in the retracted configuration, transition between a locked state and an unlocked state, wherein the locking device is configured to transition to the locked state by moving a locking bar into the coaxially aligned first and second apertures, and wherein the locking device is configured to transition to the unlocked state by removing the locking bar from the coaxially aligned first and second apertures.

8. The mechanical arm of claim 6, wherein the first mast is fixedly attached to the distal arm section of the horizontal displacement system.

9. The mechanical arm of claim 1, wherein:

the two first sprockets pivotally mounted on the first mast comprise:

a driving sprocket positioned at a vertical lower end of the first mast; and a driven sprocket positioned at a vertical upper end of the first mast; and the motor is mounted to the first mast proximate the driving sprocket.

10. The mechanical arm of claim 9, further comprising:

a gearbox drivingly engaged by the motor, wherein the driving sprocket is drivingly engaged by the motor via the gearbox.

11. The mechanical arm of claim 10, wherein the driving sprocket, the gearbox, and the motor are horizontally arranged along a rotational axis of the driving sprocket.

12. The mechanical arm of claim 9, wherein the at least two sprockets pivotally mounted on the first mast further comprise a tensioning sprocket and an idler sprocket that are configured to maintain tension in the first chain.

13. The mechanical arm of claim 12, wherein:

the tensioning sprocket and the idler sprocket mesh with the first chain; and the closed loop formed by the first chain further extends around the tensioning sprocket and the idler sprocket.

14. The mechanical arm of claim 13, wherein each of the tensioning sprocket and the idler sprocket is respectively positioned closer to the driving sprocket than its respective position relative to the driven sprocket.

15. A horizontal displacement system for a mechanical arm of a garbage truck, the horizontal displacement system comprising:

a proximal arm section securable to a frame of the garbage truck, the proximal arm section defining a first aperture;

a distal arm section engaged to the proximal arm section and movable relative to the proximal arm section in a direction being substantially parallel to a ground surface, the distal arm section defining a second aperture;

a motor drivingly engaged to the distal arm section and operable to linearly move the distal arm section relative to the proximal arm section between a retracted configuration in which the proximal and distal arm sections overlap one another such that the first and second apertures are coaxially aligned, and an expanded configuration in which at least a portion of the distal arm section is offset from the proximal arm section, the linear movement translating the second aperture relative to the first aperture in the direction substantially parallel to the ground surface; and a locking device configured to, when the distal arm section is in the retracted configuration, transition between a locked state and an unlocked state, wherein the locking device is configured to transition to the locked state by moving a locking bar into the coaxially aligned first and second apertures, and wherein the locking device is configured to transition to the unlocked state by removing the locking bar from the coaxially aligned first and second apertures.

16. The horizontal displacement system of claim 15, wherein the motor is mounted to the proximal arm section and remains immobile relative to the frame of the garbage truck between the retracted configuration and the expanded configuration.

17. The horizontal displacement system of claim 15, further comprising an intermediate arm section defining a third aperture, wherein, when the distal arm section is in the retracted configuration, the proximal, distal, and intermediate arm sections overlap one another such that the first, second, and third apertures are coaxially aligned.

18. The horizontal displacement system of claim 15, further comprising an actuator selected from the group consisting of: a linear actuator, a solenoid, a pneumatic actuator, and a hydraulic actuator.

19. The horizontal displacement system of claim 18, wherein the locking device further comprises a lever comprising a first portion pivotally connected to the actuator and a second portion pivotally connected to the locking bar.

20. The horizontal displacement system of claim 15, wherein the locking device further comprises a wearing ring configured to be secured to the locking bar via a clip.

\*   \*   \*   \*   \*